US009789876B1

(12) United States Patent
Livshiz et al.

(10) Patent No.: US 9,789,876 B1
(45) Date of Patent: Oct. 17, 2017

(54) AXLE TORQUE CONTROL SYSTEM FOR A MOTOR VEHICLE

(71) Applicant: GM Global Technology Operations LLC, Detroit, MI (US)

(72) Inventors: Michael Livshiz, Ann Arbor, MI (US); Christopher E. Whitney, Commerce, MI (US); Kevin C. Wong, Canton, MI (US); Daniele Bernardini, Siena (IT); Alberto Bemporad, Lucca (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/184,706

(22) Filed: Jun. 16, 2016

(51) Int. Cl.
| | |
|---|---|
| *G06F 17/00* | (2006.01) |
| *B60W 30/188* | (2012.01) |
| *B60W 10/06* | (2006.01) |
| *B60W 10/11* | (2012.01) |

(52) U.S. Cl.
CPC .......... *B60W 30/188* (2013.01); *B60W 10/06* (2013.01); *B60W 10/11* (2013.01); *B60W 2510/0623* (2013.01); *B60W 2520/10* (2013.01); *B60W 2540/10* (2013.01); *B60W 2710/0666* (2013.01); *B60W 2710/1005* (2013.01)

(58) Field of Classification Search
None
See application file for complete search history.

(56) References Cited

U.S. PATENT DOCUMENTS

| | | | | |
|---|---|---|---|---|
| 6,173,226 B1* | 1/2001 | Yoshida | ................ | B60W 10/06 477/105 |
| 7,222,012 B2* | 5/2007 | Simon, Jr. | ............. | B60W 10/06 477/107 |
| 7,433,775 B2 | 10/2008 | Livshiz | | |
| 7,563,194 B2* | 7/2009 | Murray | ................ | B60W 10/06 477/40 |
| 7,698,048 B2* | 4/2010 | Jung | ..................... | F02D 41/102 477/120 |
| 8,078,371 B2* | 12/2011 | Cawthorne | .............. | B60K 6/40 180/65.28 |
| 8,121,763 B2* | 2/2012 | Hou | .................. | B60W 30/1882 701/51 |
| 8,219,304 B2* | 7/2012 | Soma | ...................... | B60L 11/14 477/3 |
| 8,744,716 B2* | 6/2014 | Kar | ....................... | F02D 11/105 701/110 |
| 8,977,457 B2* | 3/2015 | Robinette | ............. | B60W 10/02 477/166 |

(Continued)

*Primary Examiner* — Dirk Wright

(57) ABSTRACT

A powertrain control system for a motor vehicle having a transmission and an engine includes an axle torque controller that determines a desired engine torque and a desired speed ratio from a plurality of inputs, an engine controller that determines a commanded engine torque based on the desired engine torque, wherein the commanded engine torque is used to control the engine to produce an actual engine torque, a transmission controller that determines a commanded gear ratio based on the desired gear ratio, wherein the commanded gear ratio is used to control the transmission to produce an actual gear ratio, and an estimator that determines an actual axle torque of the motor vehicle from the actual engine torque and the actual gear ratio. The plurality of inputs includes a desired axle torque, the actual axle torque, a desired fuel rate, an actual fuel rate.

21 Claims, 3 Drawing Sheets

(56) References Cited

U.S. PATENT DOCUMENTS

| | | | | |
|---|---|---|---|---|
| 9,067,593 B2* | 6/2015 | Dufford | ................ | B60W 10/06 |
| 2007/0191181 A1* | 8/2007 | Burns | ................... | B60W 10/08 477/40 |
| 2015/0315767 A1* | 11/2015 | Miyamoto | .............. | E02F 3/283 701/50 |

* cited by examiner

AXLE TORQUE CONTROL SYSTEM FOR A MOTOR VEHICLE

TECHNICAL FIELD

The invention relates to an axle torque control system for a motor vehicle having an engine and a transmission, and more particularly to an axle torque control system for a motor vehicle that uses a multivariable controller.

BACKGROUND

Powertrain control in a motor vehicle generally involves reading driver and vehicle inputs, such as accelerator pedal position, vehicle sensor data, torque requests, and communicating these inputs to an Engine Control Module (ECM) and a Transmission Control Module (TCM). The ECM calculates a desired axle torque from the driver and vehicle inputs. The desired axle torque is then communicated to the engine and to the TCM. The engine is controlled based on the desired axle torque to produce an actual axle torque. Meanwhile, the TCM calculates a desired speed or gear ratio from the desired axle torque and the vehicle speed. The desired gear ratio is then communicated to the transmission. The transmission is controlled based on the desired gear ratio to produce an actual gear ratio. The actual axle torque and the actual gear ratio define the operating conditions of the motor vehicle.

While this system of powertrain control is useful for its intended purpose, there is room in the art for improvements in powertrain control that provide dynamic control of the axle torque to balance performance and fuel economy, especially in powertrains having a continuously variable transmission or stepped transmissions with multiple gears.

SUMMARY

A powertrain control system for a motor vehicle having a transmission and an engine is provided. The powertrain control system includes an axle torque controller that determines a desired engine torque and a desired speed ratio from a plurality of inputs, an engine controller that determines a commanded engine torque based on the desired engine torque, wherein the commanded engine torque is used to control the engine to produce an actual engine torque, a transmission controller that determines a commanded gear ratio based on the desired gear ratio, wherein the commanded gear ratio is used to control the transmission to produce an actual gear ratio, and an estimator that determines an actual axle torque of the motor vehicle from the actual engine torque and the actual gear ratio. The plurality of inputs includes a desired axle torque, the actual axle torque, a desired fuel rate, an actual fuel rate.

In one aspect, the axle torque controller is a multivariable controller that optimizes the desired fuel rate and the desired axle torque.

In another aspect, the axle torque controller includes a cost function based on the desired axle torque, the desired fuel rate, the actual axle torque, and the actual fuel rate, and wherein the cost function is minimized.

In another aspect, the axle torque controller is one of a linear quadratic controller, a quasi-linear controller, or a model predictive controller.

In another aspect, the plurality of inputs further includes engine inputs from the engine controller and transmission inputs from the transmission controller.

In another aspect, the engine inputs include a maximum engine torque, a minimum engine torque, a maximum change in engine torque, and a minimum change in engine torque.

In another aspect, the axle controller limits the desired engine torque to be less than the maximum engine torque and greater than the minimum engine torque, and limits a change in the desired engine torque to be less than the maximum change in engine torque and greater than the minimum change in engine torque.

In another aspect, the transmission inputs include a maximum gear ratio, a minimum gear ratio, a maximum change in gear ratio, and a minimum change in gear ratio.

In another aspect, the axle controller limits the desired gear ratio to be less than the maximum gear ratio and greater than the minimum gear ratio, and limits a change in the desired gear ratio to be less than the maximum change in gear ratio and greater than the minimum change in gear ratio.

In another aspect, the desired axle torque is determined from a vehicle accelerator pedal position sensed from a vehicle pedal sensor and a vehicle speed sensed from a vehicle speed sensor.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
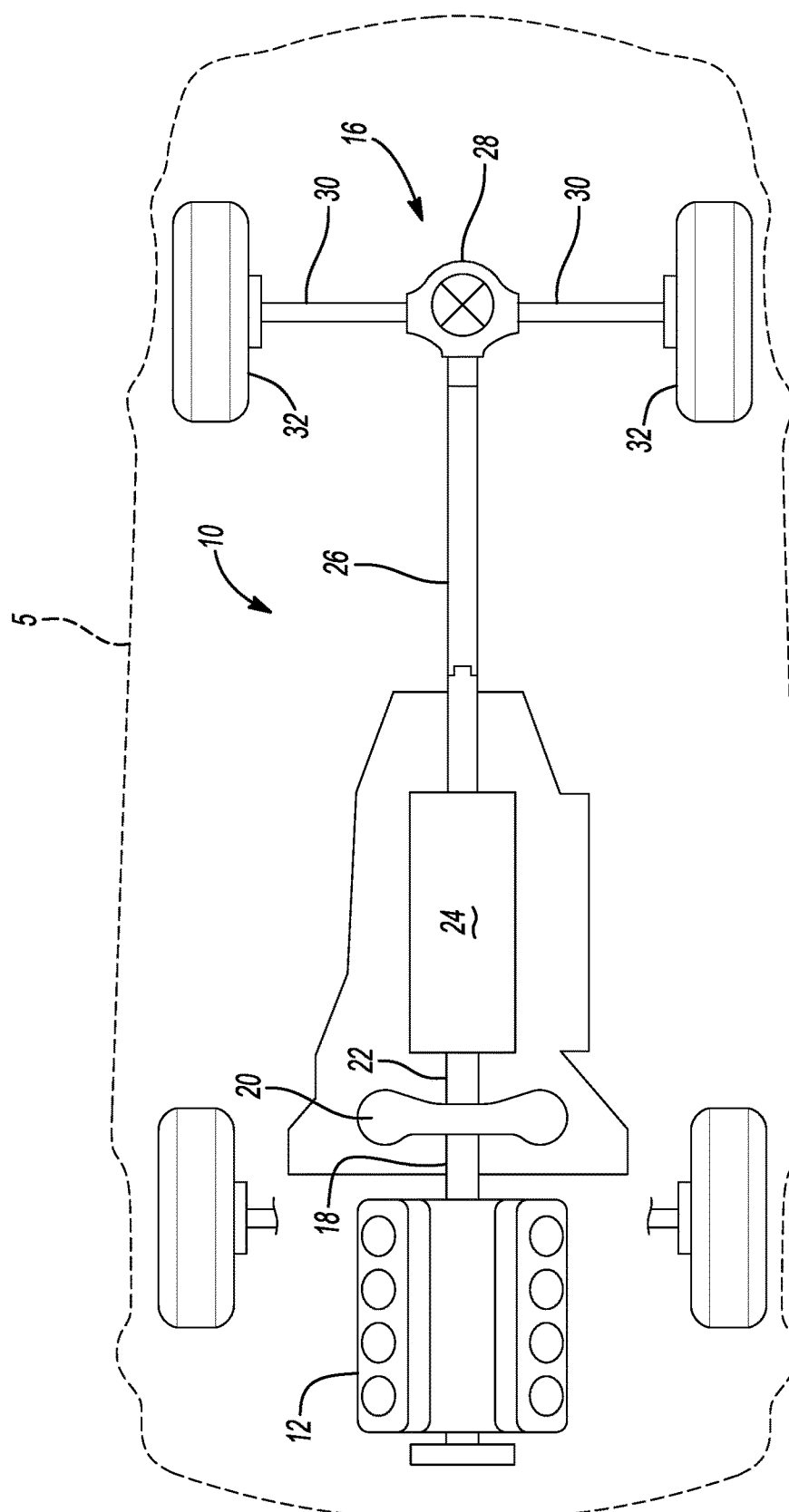
FIG. 1 is a schematic diagram of an exemplary powertrain in a motor vehicle.

With reference to FIG. 1, an exemplary motor vehicle is shown and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present disclosure. The powertrain 10 generally includes an engine 12 interconnected with a transmission 14 and a final drive unit 16.

The engine 12 may be a conventional internal combustion engine or an electric engine, hybrid engine, or any other type of prime mover, without departing from the scope of the present disclosure. The engine 12 supplies a driving torque to the transmission 14 via a crankshaft 18. The driving torque may be transmitted through a flexplate and/or starting device 20 to the transmission 14. The starting device 20 may be a hydrodynamic device, such as a fluid coupling or torque converter, a wet dual clutch, or an electric motor. Torque is then transmitted from the starting device to at least one transmission input shaft 22.

The transmission 14 may be a stepped transmission having planetary gears, a countershaft transmission, a continuously variable transmission, or an infinitely variable transmission. Torque from the transmission input shaft 22 is communicated through a ratio control unit 24 to a transmission output shaft 26. Generally, the ratio control unit 24 includes gears, shafts, countershafts, clutches, brakes, and/or synchronizers that are selectively engageable to provide a plurality of forward or reverse speed or gear ratios between the transmission input shaft 22 and the transmission output shaft 26. Where the transmission 14 is a continuously variable transmission, the ratio control unit 24 may include an endless member wrapped around variable diameter pulleys.

The transmission output shaft 26 communicates output torque to the final drive unit 16, either through direct gearing or a chain drive. The final drive unit 16 generally includes a differential 28 that transfers torque through axles 30 to drive wheels 32.

Figure 2:
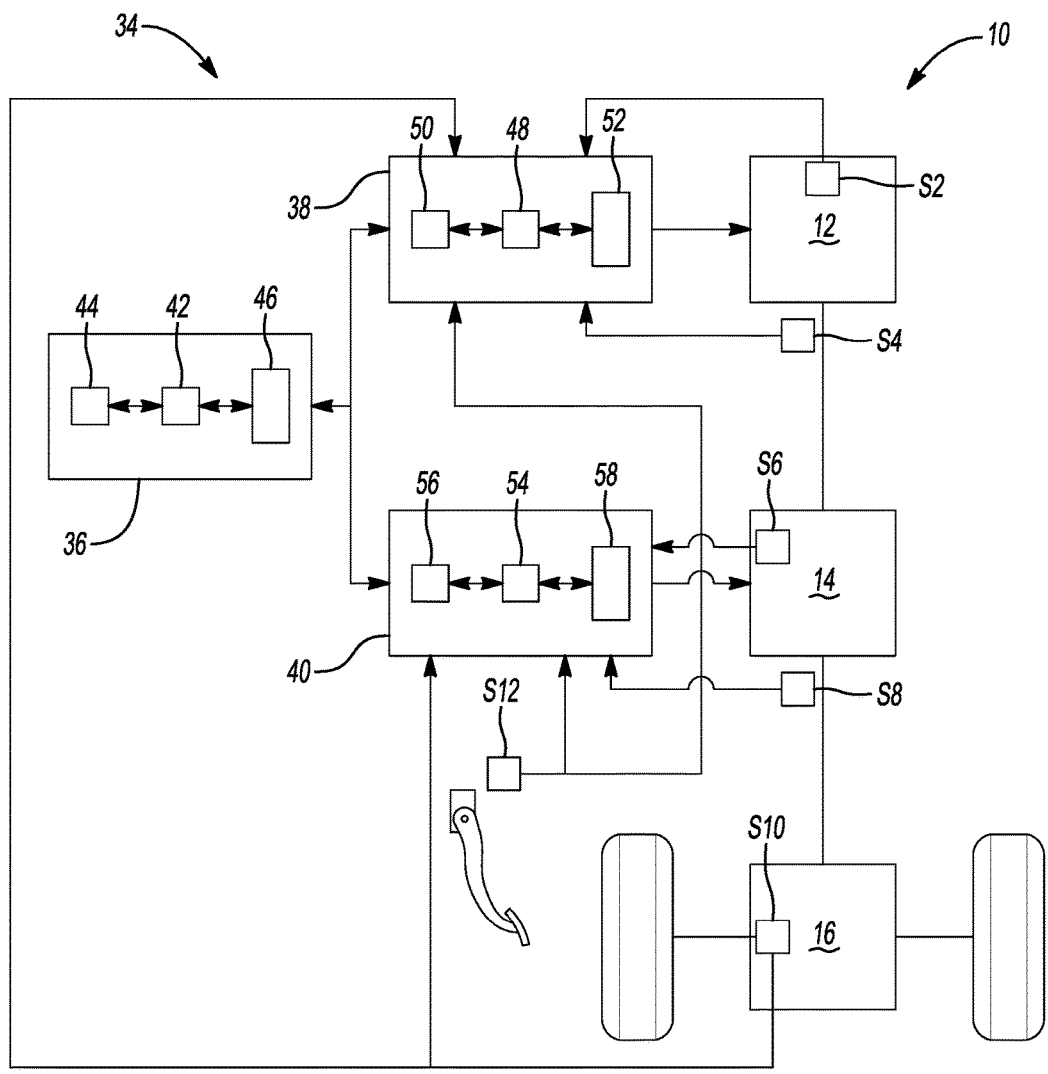
FIG. 2 is a schematic diagram of a powertrain control system for use with the motor vehicle.

Turning now to FIG. 2, a powertrain control system for use with the exemplary powertrain 10 is generally indicated by reference number 34. The powertrain control system 34 includes a supervisory control module 36 in electronic communication with an engine control module 38 and a transmission control module 40. The modules 36, 38, and 40 may communicate through a vehicle network or cable area network (CAN) bus. The powertrain control system 34 may include or communicate with various other control modules, such as a body control module or infotainment control module. Alternatively, the supervisory control module 36 may be subsumed within the engine control module 38 or transmission control module 40.

The supervisory control module 36 is a non-generalized, electronic control device having a preprogrammed digital computer or processor 42, memory or non-transitory computer readable medium 44 used to store data such as control logic, instructions, image data, lookup tables, etc., and a plurality of input/output peripherals or ports 46. The processor 42 is configured to execute the control logic or instructions.

The engine control module 38 is a non-generalized, electronic control device having a preprogrammed digital computer or processor 48, memory or non-transitory computer readable medium 50 used to store data such as control logic, instructions, image data, lookup tables, etc., and a plurality of input/output peripherals or ports 52. The processor 48 is configured to execute the control logic or instructions. The engine control module 38 communicates with, and controls, the engine 12.

The transmission control module 40 is a non-generalized, electronic control device having a preprogrammed digital computer or processor 54, memory or non-transitory computer readable medium 56 used to store data such as control logic, instructions, image data, lookup tables, etc., and a plurality of input/output peripherals or ports 58. The processor 54 is configured to execute the control logic or instructions. The transmission control module 40 communicates with, and controls, the transmission 14.

The powertrain control system 34 communicates with a plurality of sensors connected to the powertrain 10 including an air flow sensor S2 in the engine 12, an engine speed sensor S4, a transmission input shaft speed sensor S6, a transmission output shaft speed sensor S8, a vehicle speed sensor S10, and a pedal position sensor S12. The air flow sensor S2 and the engine speed sensor S4 communicate with the engine control module 38. The transmission input shaft speed sensor S6 and the transmission output shaft speed sensor S8 communicate with the transmission control module 40. The vehicle speed sensor S10 and the pedal position sensor S12 communicate with both the engine control module 38 and the transmission control module 40.

Figure 3:
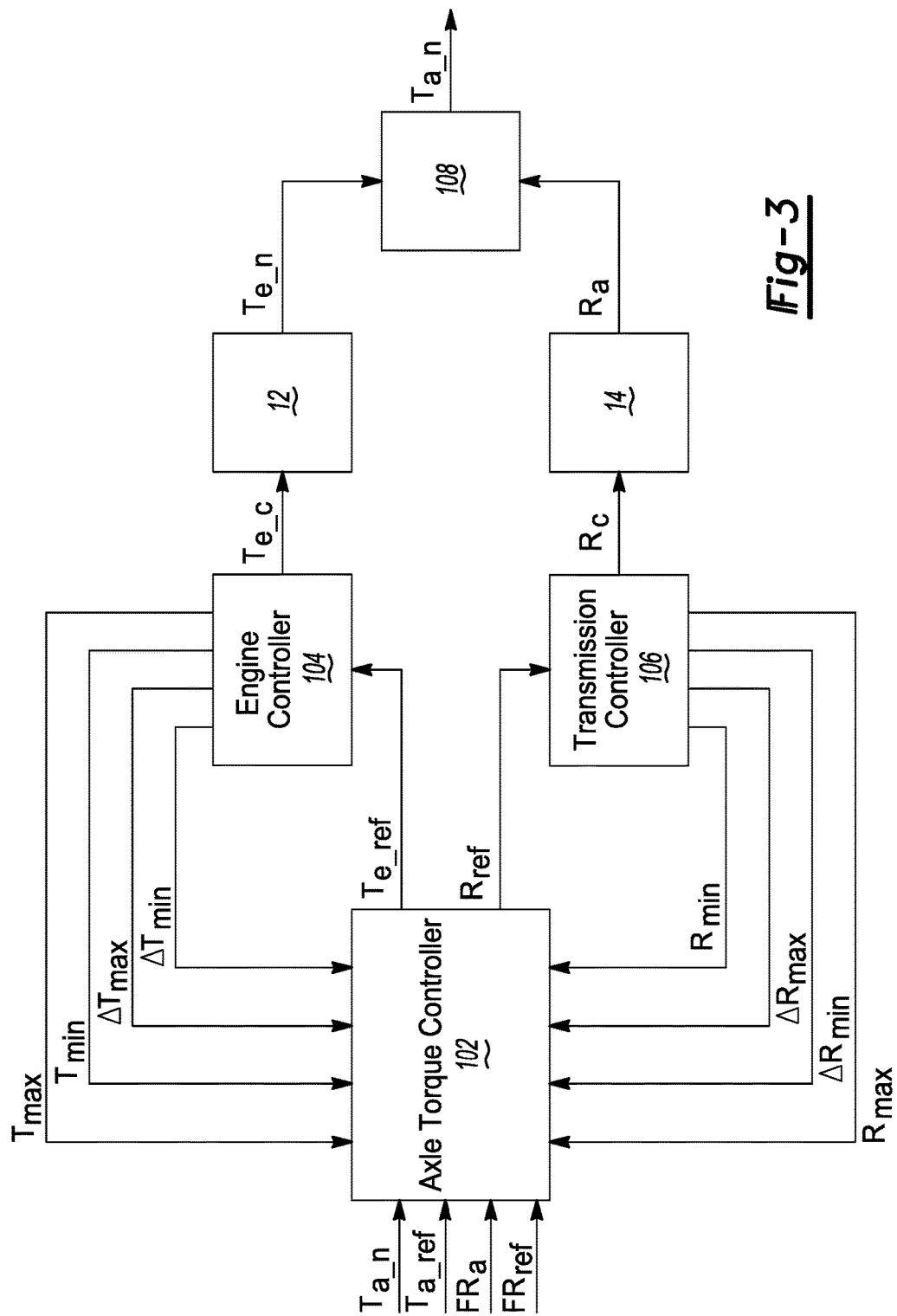
FIG. 3 is a schematic diagram of a control method for use with the power control system.

With reference to FIG. 3, and continued reference to FIGS. 1 and 2, a control diagram of the powertrain control system 34 is illustrated. The control diagram illustrates a control system or method 100 for generating an actual axle torque $T_{a\_a}$ and actual fuel consumption rate $FR_a$ by optimizing a desired (reference) axle torque $T_{a\_ref}$ and a desired fuel consumption rate $FR_{ref}$. The actual axle torque $T_{a\_a}$ is the amount of actual torque at the vehicle axle 30. The actual fuel rate $FR_a$ is the actual rate of fuel consumption by the motor vehicle 5. The actual fuel rate $FR_a$ may be determined from an estimate of air flow, for example based on data from the air flow sensor S2. The desired axle torque $T_{a\_ref}$ is the amount of torque needed at the vehicle axle 30 to fulfill a driver's intent for acceleration or deceleration. The desired axle torque $T_{a\_ref}$ is determined from a lookup table or 2D map from a vehicle speed sensed by vehicle speed sensor S10 and an accelerator pedal position sensed by the pedal position sensor S12. The desired fuel rate $FR_{ref}$ is a desired fuel consumption rate.

The control system 100 includes an axle torque controller 102, an engine controller 104, a transmission controller 106, and an estimator 108. In a preferred embodiment, the axle torque controller 102 is stored and executed by the supervisory control module 34, the engine controller 104 is stored and executed by the engine control module 36, and the transmission controller 106 is stored and executed by the transmission control module 40. The estimator 108 is preferably stored and executed by the engine control module 36 but may be stored and executed by any control module.

The axle torque controller 102 is any multivariable controller capable of optimizing the desired fuel rate $FR_{ref}$ and the desired axle torque $T_{a\_ref}$ based on a plurality of inputs. The axle torque controller 102 may be, for example, a linear quadratic controller, a quasi-linear controller, or a model predictive controller, to name but a few. The plurality of inputs include the actual axle torque $Ta\_a$, the desired axle torque $T_{a\_ref}$, the actual fuel rate $FR_a$, and the desired fuel rate $FR_{ref}$. The axle torque controller 102 determines a desired brake engine torque $T_{e\_ref}$ and a desired gear ratio $R_{ref}$ from the optimized values. The desired brake engine torque $T_{e\_ref}$ is the desired engine torque on the crankshaft 18 and the desired gear ratio $R_{ref}$ is the desired gear ratio to be provided by the transmission 14. By way of example, a linear quadratic controller may be used having a system described by the formula:

$$\dot{y}>=Ay+Bu \quad (1)$$

Where A and B are parameters of the system determined through testing, physical models, etc. The quadratic cost function is defined as follows:

$$\text{cost}=f(y_{ref}-y)^T \cdot R \cdot (y\_\text{ref}-y) \quad (2)$$

Where R is a cost function parameter. The variables y, $y_{ref}$, and u are defined as follows:

$$y = \begin{bmatrix} \delta T_{a\_a} \\ \delta FR_a \end{bmatrix} \quad (3)$$

$$y_{ref} = \begin{bmatrix} \delta T_{a\_ref} \\ \delta FR_{ref} \end{bmatrix} \quad (4)$$

$$u = \begin{bmatrix} \delta T_{e\_ref} \\ \delta R_{ref} \end{bmatrix} \quad (5)$$

The feedback control equation which minimizes the cost function is defined as follows:

$$u = -Ky \quad (6)$$

Where K is the matrix gain of the system. Thus, by optimizing the cost of the system for fuel rate and acceleration, the desired brake engine torque $T_{e\_ref}$ and the desired gear ratio $R_{ref}$ are determined.

The axle torque controller 102 receives system limitations from the engine controller 104 including a maximum brake engine torque $T_{e\_max}$, a minimum brake engine torque $T_{e\_min}$, a maximum change in brake engine torque $\delta T_{e\_max}$, and a minimum change in brake engine torque $\delta T_{e\_min}$. The axle torque controller 10 subjects the desired brake engine torque $T_{e\_ref}$ and the change in the desired brake engine torque $\delta T_{e\_ref}$ to the following limitations:

$$T_{e\_min} \leq T_{e\_ref} \leq T_{e\_max} \quad (7)$$

$$\delta T_{e\_min} \leq \delta T_{e\_ref} \leq \delta T_{e\_max} \quad (8)$$

The axle torque controller 102 also receives system limitations from the transmission controller 106 including a maximum gear ratio $R_{max}$, a minimum gear ratio $R_{min}$, a maximum change in gear ratio $\delta R_{max}$, and a minimum change in gear ratio $\delta R_{min}$. The axle torque controller 10 subjects the desired gear ratio $R_{ref}$ and the change in the desired gear ratio $\delta R_{ref}$ to the following limitations:

$$R_{min} \leq R_{ref} \leq R_{max} \quad (9)$$

$$\delta R_{min} \leq \delta R_{ref} \leq \delta R_{max} \quad (10)$$

The desired brake engine torque $T_{e\_ref}$ is communicated to the engine controller 104. The engine controller 104 may be any type of controller that provides a commanded brake engine torque $T_{e\_c}$ based on the desired brake engine torque $T_{e\_ref}$. The commanded brake engine torque $T_{e\_c}$ is used to control the engine 12 to provide an actual brake engine torque $T_{e\_a}$ that is the brake engine torque actually communicated to the transmission 14.

The desired gear ratio $R_{ref}$ is communicated to the transmission controller 106. The transmission controller 106 may be any type of controller that provides a commanded gear ratio $R_c$ based on the desired gear ratio $R_{ref}$. The commanded gear ratio $R_c$ is used to control the transmission 14 to provide an actual gear ratio $R_a$ between the transmission input shaft 22 and the transmission output shaft 26.

The estimator 108 then determines or estimates the actual axle torque $T_{a\_a}$ based on the actual brake engine torque $T_{e\_a}$, the actual gear ratio $R_a$, and losses associated with the system. The actual brake engine torque $T_{e\_a}$ may be sensed form the engine torque sensor S4. The actual gear ratio $R_a$ may be determined from the speed of the transmission input shaft 22 sensed by the transmission input shaft speed sensor S6 and the speed of the transmission output shaft 26 sensed by the transmission output shaft speed sensor S8. The actual axle torque $T_{a\_a}$ is then communicated back to the axle torque controller 102 to be used in the determination of the desired brake engine torque $T_{e\_ref}$ and the desired gear ratio $R_{ref}$. The system 100 repeats to provide dynamic, up to date control of the actual axle torque of the motor vehicle 5 while optimizing the fuel consumption rate of the vehicle.

The description of the invention is merely exemplary in nature and variations that do not depart from the general essence of the invention are intended to be within the scope of the invention. Such variations are not to be regarded as a departure from the spirit and scope of the invention.

The following is claimed:

1. A powertrain control system for a motor vehicle having a transmission and an engine, the powertrain control system comprising:
   an axle torque controller that determines a desired engine torque and a desired speed ratio from a plurality of inputs;
   an engine controller that determines a commanded engine torque based on the desired engine torque, wherein the commanded engine torque is used to control the engine to produce an actual engine torque;
   a transmission controller that determines a commanded gear ratio based on the desired gear ratio, wherein the commanded gear ratio is used to control the transmission to produce an actual gear ratio; and
   an estimator that determines an actual axle torque of the motor vehicle from the actual engine torque and the actual gear ratio,
   wherein the plurality of inputs includes a desired axle torque, the actual axle torque, a desired fuel rate, an actual fuel rate.

2. The powertrain control system of claim 1 wherein the axle torque controller is a multivariable controller that optimizes the desired fuel rate and the desired axle torque.

3. The powertrain control system of claim 2 wherein the axle torque controller includes a cost function based on the desired axle torque, the desired fuel rate, the actual axle torque, and the actual fuel rate, and wherein the cost function is minimized.

4. The powertrain control system of claim 2 wherein the axle torque controller is one of a linear quadratic controller, a quasi-linear controller, or a model predictive controller.

5. The powertrain control system of claim 1 wherein the plurality of inputs further includes engine inputs from the engine controller and transmission inputs from the transmission controller.

6. The powertrain control system of claim 5 wherein the engine inputs include a maximum engine torque, a minimum engine torque, a maximum change in engine torque, and a minimum change in engine torque.

7. The powertrain control system of claim 6 wherein the axle controller limits the desired engine torque to be less than the maximum engine torque and greater than the minimum engine torque, and limits a change in the desired engine torque to be less than the maximum change in engine torque and greater than the minimum change in engine torque.

8. The powertrain control system of claim 5 wherein the transmission inputs include a maximum gear ratio, a minimum gear ratio, a maximum change in gear ratio, and a minimum change in gear ratio.

9. The powertrain control system of claim 8 wherein the axle controller limits the desired gear ratio to be less than the maximum gear ratio and greater than the minimum gear ratio, and limits a change in the desired gear ratio to be less than the maximum change in gear ratio and greater than the minimum change in gear ratio.

10. The powertrain control system of claim 1 wherein the desired axle torque is determined from a vehicle accelerator pedal position sensed from a vehicle pedal sensor and a vehicle speed sensed from a vehicle speed sensor.

11. A method for controlling a powertrain of a motor vehicle comprising:
   determining a desired axle torque;
   determining a desired engine torque and a desired gear ratio based on the desired axle torque and a plurality of inputs;
   determining a commanded axle torque based on the desired engine torque;
   controlling the engine to produce an actual engine torque using the commanded engine torque;
   determining a commanded gear ratio based on the desired gear ratio;
   controlling the transmission to produce an actual gear ratio using the commanded gear ratio;
   estimating an actual axle torque based on the actual engine torque and the actual gear ratio; and
   communicating the actual axle torque to the supervisory control module as one of the plurality of inputs.

12. The method of claim 11 further comprising determining a desired fuel rate and an actual fuel rate, and wherein the plurality of inputs further includes the desired fuel rate and the actual fuel rate.

13. The method of claim 12 wherein determining the desired engine torque and the desired gear ratio includes using a multivariable controller to optimize the desired axle torque and the desired fuel rate.

14. The method of claim 12 wherein the multivariable controller is one of a linear quadratic controller, a quasi-linear controller, or a model predictive controller.

15. The method of claim 11 further comprising limiting the desired engine torque to a value within a torque engine range.

16. The method of claim 11 further comprising limiting a change in the desired engine torque to a value within a change in torque range.

17. The method of claim 11 further comprising limiting the desired gear ratio to a value within a gear ratio range.

18. The method of claim 11 further comprising limiting a change in the desired gear ratio to a value within a change in gear ratio range.

19. The method of claim 11 wherein the desired axle torque is determined from an accelerator pedal position and a vehicle speed.

20. A method for controlling a powertrain of a motor vehicle using a supervisory control module, the powertrain having an engine controlled by an engine control module and a transmission controlled by a transmission control module, the method comprising:
   determining, by the supervisory control module, a desired axle torque from a vehicle pedal position and a vehicle speed;
   determining, by the supervisory control module, a desired engine torque and a desired gear ratio based on the desired axle torque and a plurality of inputs;
   determining, by the engine control module, a commanded axle torque based on the desired engine torque;
   controlling the engine to produce an actual engine torque using the commanded engine torque;
   determining, by the transmission control module, a commanded gear ratio based on the desired gear ratio;
   controlling the transmission to produce an actual gear ratio using the commanded gear ratio;
   estimating, by the engine control module, an actual axle torque based on the actual engine torque and the actual gear ratio; and
   communicating the actual axle torque to the supervisory control module as one of the plurality of inputs.

21. The method of claim 20 further comprising determining a desired fuel rate and an actual fuel rate, and wherein the plurality of inputs further includes the desired fuel rate and the actual fuel rate.

* * * * *